US009665436B2

(12) United States Patent
Katori et al.

(10) Patent No.: US 9,665,436 B2
(45) Date of Patent: May 30, 2017

(54) CREATION AND MANAGEMENT OF LOGICAL VOLUME SNAPSHOTS UNDER HIERARCHICAL STORAGE SYSTEM

(71) Applicant: GLOBALFOUNDRIES U.S. 2 LLC, Hopewell Junction, NY (US)

(72) Inventors: Katsuyoshi Katori, Kanagawa (JP); Koichi Masuda, Kanagawa-ken (JP); Takeshi Nohta, Ibaragi pref. (JP)

(73) Assignee: GLOBALFOUNDRIES INC., Grand Cayman (KY)

( * ) Notice: Subject to any disclaimer, the term of this patent is extended or adjusted under 35 U.S.C. 154(b) by 133 days.

(21) Appl. No.: 14/488,548

(22) Filed: Sep. 17, 2014

(65) Prior Publication Data
US 2015/0113238 A1    Apr. 23, 2015

(30) Foreign Application Priority Data

Oct. 18, 2013 (JP) .................................. 2013-216977

(51) Int. Cl.
*G06F 11/14* (2006.01)
*G06F 3/06* (2006.01)

(52) U.S. Cl.
CPC .......... *G06F 11/1451* (2013.01); *G06F 3/065* (2013.01); *G06F 3/0605* (2013.01); *G06F 3/068* (2013.01); *G06F 3/0619* (2013.01); *G06F 3/0647* (2013.01); *G06F 3/0665* (2013.01); *G06F 3/0685* (2013.01); *G06F 2201/84* (2013.01)

(58) Field of Classification Search
CPC .. G06F 11/1451; G06F 3/0605; G06F 3/0619; G06F 3/0647; G06F 3/065; G06F 3/0665; G06F 3/068; G06F 3/0685; G06F 2201/84
See application file for complete search history.

(56) References Cited

U.S. PATENT DOCUMENTS

| | | | |
|---|---|---|---|
| 6,226,711 B1 * | 5/2001 | Fisher | G06F 3/0619 711/111 |
| 6,816,941 B1 * | 11/2004 | Carlson | G06F 3/0607 711/111 |

(Continued)

FOREIGN PATENT DOCUMENTS

WO     2009019128 A1    2/2009

OTHER PUBLICATIONS

Appendix P, Nov. 7, 2014.
Office Action Communication Dated Mar. 24, 2016, U.S. Appl. No. 14/516,815, pp. 1-19.

*Primary Examiner* — Arpan P. Savla
*Assistant Examiner* — William E Baughman
(74) *Attorney, Agent, or Firm* — Yuanmin Cai, Esq.

(57) ABSTRACT

The method of the present invention includes the steps of: receiving a command for creating a snapshot of the logical volume; preparing a management table for managing the snapshot; detecting the storage status of the logical volume; and updating the management table without recalling the logical volume from the second level storage to the first level storage when the logical volume has migrated from the first level storage to the second level storage. After the update, the storage table indicates whether creation of a snapshot is required, whether a logical volume has migrated, and whether the second level storage is the storage location of the logical volume.

20 Claims, 12 Drawing Sheets

(56) References Cited

U.S. PATENT DOCUMENTS

| | | | |
|---|---|---|---|
| 8,527,722 B1* | 9/2013 | Okada | G06F 3/065 |
| | | | 711/155 |
| 2004/0078533 A1* | 4/2004 | Lee | G06F 11/1456 |
| | | | 711/162 |
| 2006/0218370 A1* | 9/2006 | Satoyama | G06F 3/0605 |
| | | | 711/170 |
| 2010/0023716 A1* | 1/2010 | Nemoto | G06F 11/1451 |
| | | | 711/162 |
| 2013/0007388 A1* | 1/2013 | Kito | G06F 3/0608 |
| | | | 711/162 |

* cited by examiner

| LVOL_TOK | snap creation not required |
|---|---|
| LVOL | migrated |
| LVOL_TO_PVOL | PVOLX |
| LVOL_TOK_SNAP | not present (NA) |
| LVOL_SNAP | not present (NA) |
| LVOL_TO_PVOL_SNAP | not present (NA) |

FIG. 6

| LVOL_TOK | snap creation required |
| --- | --- |
| LVOL | migrated |
| LVOL_TO_PVOL | PVOLX |
| LVOL_TOK_SNAP | snap creation required |
| LVOL_SNAP | migrated |
| LVOL_TO_PVOL_SNAP | PVOLX |

FIG. 7

| LVOL_TOK | snap created |
|---|---|
| LVOL | pre-migrated/cached |
| LVOL_TO_PVOL | PVOLX/NA (not present) |
| LVOL_TOK_SNAP | snap created |
| LVOL_SNAP | pre-migrated/cached |
| LVOL_TO_PVOL_SNAP | PVOLX/NA (not present) |

FIG. 8

| LVOL_TOK | snap created |
|---|---|
| LVOL | pre-migrated |
| LVOL_TO_PVOL | PVOLX |
| LVOL_TOK_SNAP | snap created |
| LVOL_SNAP | pre-migrated |
| LVOL_TO_PVOL_SNAP | PVOLX |

FIG. 9

| LVOL_TOK | snap creation not required |
|---|---|
| LVOL | cached |
| LVOL_TO_PVOL | deleted (NA) |
| LVOL_TOK_SNAP | snap creation not required |
| LVOL_SNAP | migrated |
| LVOL_TO_PVOL_SNAP | PVOLX |

FIG. 10

| LVOL_TOK | deleted (NA) |
|---|---|
| LVOL | deleted (NA) |
| LVOL_TO_PVOL | deleted (NA) |
| LVOL_TOK_SNAP | snap creation not required |
| LVOL_SNAP | migrated |
| LVOL_TO_PVOL_SNAP | PVOLX |

FIG. 11

| LVOL_TOK | snap creation not required |
|---|---|
| LVOL | migrated |
| LVOL_TO_PVOL | PVOLX |
| LVOL_TOK_SNAP | snap creation not required |
| LVOL_SNAP | cached |
| LVOL_TO_PVOL_SNAP | deleted (NA) |

FIG. 12

| LVOL_TOK | snap creation not required |
| LVOL | migrated |
| LVOL_TO_PVOL | PVOLX |
| LVOL_TOK_SNAP | deleted (NA) |
| LVOL_SNAP | deleted (NA) |
| LVOL_TO_PVOL_SNAP | deleted (NA) |

CREATION AND MANAGEMENT OF LOGICAL VOLUME SNAPSHOTS UNDER HIERARCHICAL STORAGE SYSTEM

The present patent application is a DOMESTIC COUNTERPART of, and claims priority under PCT to, the foreign patent application No. 2013-216977 filed in Japan on Oct 18, 2013.

TECHNICAL FIELD

The present invention relates to a storage system and, more specifically, to a method for creating and managing hierarchically managed logical volume snapshots in a storage system.

BACKGROUND ART

In storage systems, data (files) are hierarchically managed using relatively fast, higher-level storage such as a hard disk drive (HDD), and relatively slow, lower-level storage such as a tape drive. In storage systems, logic volume management (LVM) is also performed using logical volumes logically segmented into volume groups of more than one logical volume.

In copy services providing various types of storage subsystems, file systems and applications in addition to this type of storage management, techniques are used to store images of data at a certain instant (hereinafter referred to as "Time 0"). Examples of these techniques include snapshots and flash copies. The detailed mechanisms of this technique differ depending on the hardware and software being used but pointer information indicating locations where files (data) are being stored at Time 0 is generally saved, and this pointer information is used to manage the original files and images created at Time 0. In the following explanation, the term "snapshot" is used synonymously with "flash copy".

Existing snapshots are valid only for files stored on the disk at Time 0, and a snapshot cannot be created when the target file is not present on the disk. In other words, snapshots are of a disk on a single level, and can be created and managed by creating and using pointer data when valid data is present on the disk. A snapshot cannot be created if data is not present on the disk.

However, when files are hierarchically managed using a disk and physical tape, valid data is sometimes present on the physical tape even when there is no valid data present on the disk. Also, data can be moved from disk to physical tape hierarchically. When files are hierarchically managed in these situations, it is difficult to create and manage snapshots by using the simple pointer information archived by the conventional snapshot functions.

WO 2009/019128A1, hereinafter referred to as Patent Literature 1, describes a file management method for hierarchical management of files using a disk and physical tape which includes snapshot files using i-nodes of each source file and i-nodes of each snapshot file for each source file. However, Patent Literature 1 does not describe a method for creating and managing snapshots when no valid data is present on the disk but valid data is present on physical tape.

SUMMARY OF INVENTION

Therefore, it is an object of the present invention to provide a method for creating and managing snapshots of hierarchically managed logical volumes even in situations in which there is no valid data on a disk but there is valid data on a physical tape.

The present invention is a method for creating and managing snapshots of hierarchically managed logical volumes in a storage system. The storage system includes first level storage and second level storage lower than the first level storage. This method includes the steps of:

(a) receiving a command for creating a snapshot of the logical volume;

(b) preparing a management table for managing the snapshot, the management table including first metadata indicating the creation status of the snapshot, second metadata indicating the management status of the snapshot, and third metadata indicating the storage location of the logical volume;

(c) detecting the storage status of the logical volume; and (d) updating the management table without recalling the logical volume from the second level storage to the first level storage when the logical volume has migrated from the first level storage to the second level storage, the first metadata indicating that creation of a snapshot is required, the second metadata indicating that the logical volume has migrated, and the third metadata indicating that the second level storage is the storage location of the logical volume.

By updating and reusing a management table to manage a snapshot, the present invention is able to create and manage a snapshot of hierarchically managed logical volumes when the logical volume has migrated from the first level storage to the second level storage without directly having to immediately recall the logical volume from the second level storage to the first level storage.

The method in one aspect of the present invention also includes the steps of:

(e) recalling the logical volume when access to the logical volume or the snapshot is requested;

(f) creating a snapshot from the logical volume recalled to the first level storage; and (g) updating the management table, the first metadata indicating that the snapshot has been created, the second metadata indicating that the logical volume has pre-migrated, and the third metadata indicating that the second level storage is the storage location of the logical volume.

By creating a snapshot and updating and reusing a management table when access to a logical volume or snapshot is requested, one aspect of the present invention is the ability to respond to the access request and properly manage the snapshot afterwards.

The method in one aspect of the present invention also includes the step of:

(h) updating the management table when overwriting of the logical volume or deletion of the logical volume is requested, the first metadata indicating that creation of a snapshot is not required, the second metadata indicating that the logical volume has migrated, and the third metadata indicating that the second level storage is the storage location of the logical volume.

By not requiring the creation of a snapshot and keeping the second level storage as the storage location of the logical volume, one aspect of the present invention is the ability to create and manage logical volumes and their snapshots stored in this location when the overwriting or deletion of a logical volume previously used in a command to create a snapshot is requested.

The method in one aspect of the present invention also includes the step of:

(i) updating the management table when overwriting of the snapshot is requested, the first metadata indicating that creation of a snapshot is not required, the second metadata indicating that the logical volume is located in the first level storage, and the third metadata indicating that deletion has been performed.

The method in one aspect of the present invention also includes the step of:

(j) updating the management table when deletion of the snapshot is requested, the first metadata indicating that deletion has been performed, the second metadata indicating that deletion has been performed, and the third metadata indicating that deletion has been performed.

DETAILED DESCRIPTION

Figure 1:
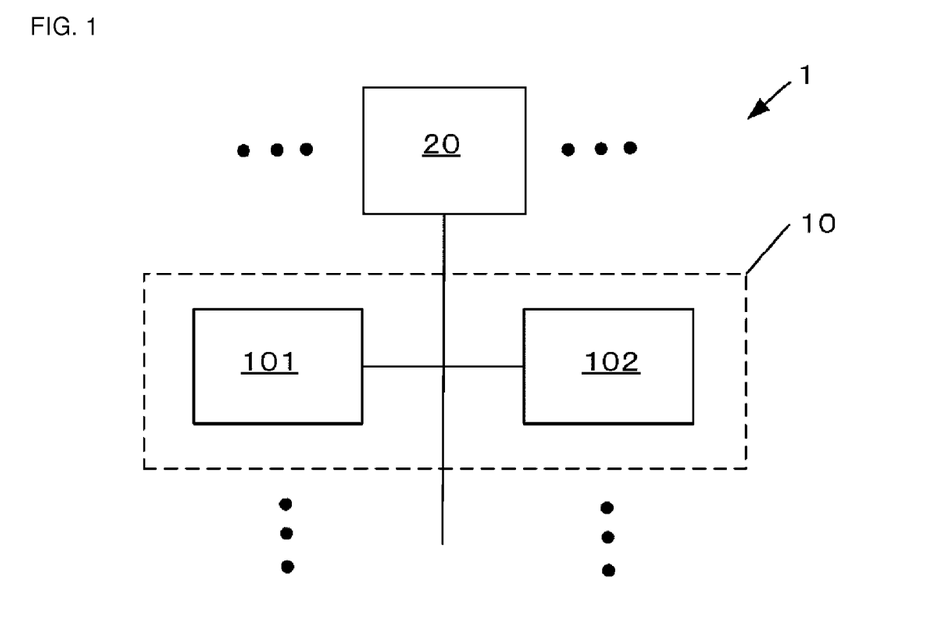
FIG. 1 is a diagram showing a configuration example of a storage system used by the method of the present invention.

The following is an explanation of an embodiment of the present invention with reference to the drawings. FIG. 1 is a diagram showing a configurational example of a storage system used by the method of the present invention. The storage system 10 includes first storage 101 and second storage 102 which can communicate so as to enable communication. FIG. 1 shows a configuration with the minimal requirements for hierarchical management. The storage system 10 can be connected to multiple hosts (servers), and can include multiple units of first storage 101 and second storage 102. A configuration including the storage system 10 and the host 20 can serve as an entire system 1 (for example, a data system, or data management system) or as part of a system.

In one embodiment, the first storage 101 in the storage system 10 can be storage including a higher level disk (sometimes referred to as the disk cache or HDD below), and the second storage 102 can be storage including lower level physical tape (tape drive). The configuration (or combination) of first storage 101 and second storage 102 can be any hierarchically organized combination and is not restricted to combinations of disks and physical tape. In the following explanation, the storage system is Virtual Tape Server TS7700® provided by the applicant, International Business Machines Corporation. (hereinafter referred to as the TS7700.) The TS7700 can include, as a minimal configuration, the disk cache and physical tape illustrated in the storage system 10 of FIG. 1.

Figure 2:
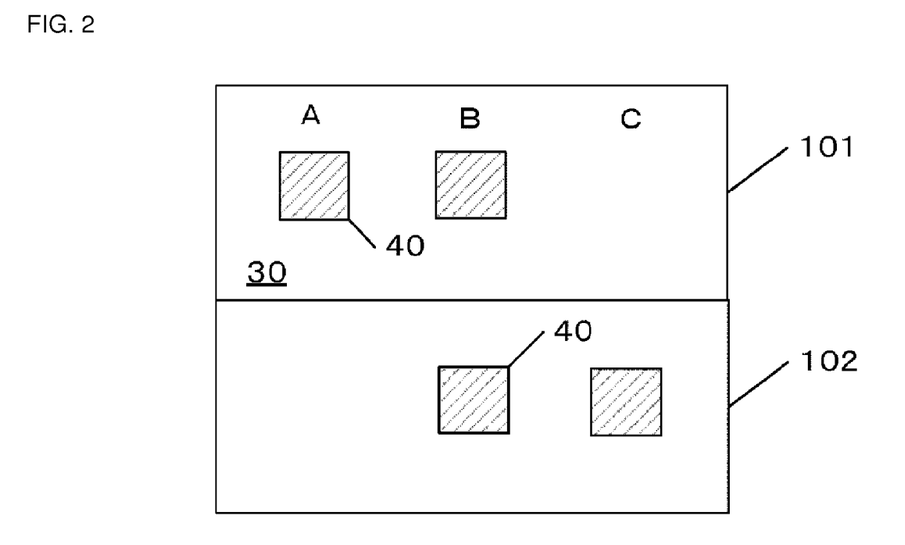
FIG. 2 is a diagram showing an example of a data storage status.

FIG. 2 shows the storage states of data in the TS7700. The data written from the host 20 is written to the disk cache 101 in units known as "logical volumes" 30. As mentioned above, logical volumes 30 are segmented logically into volume groups composed of more than one physical volume. The host 20 issues a mount command for a logical volume 30, and the logical volume 30 is read or written. The host 20 then rewinds, unloads, and ends access. After access has been ended, the data is moved from the disk cache 101 to physical tape 102 and hierarchically managed according to the policies established by the user for each logical volume 30.

As shown in FIG. 2, data 40 inside the TS7700 is stored in one of the following three storage states.

A: Present only in the disk cache 101

B: Present both in the disk cache 101 and on physical tape 102

C: Present only on physical tape 102

A transition from storage state A to storage state B is referred to as pre-migration, a transition from storage state B to storage state C is referred to as migration, and transition from storage state C to storage state B is referred to as a recall.

In the TS7700, data in the disk cache 101 is read and written via the General Parallel File System® (GPFS). The GPFS provides a snapshot function on both the file system level and the individual file level. In the following explanation, the logical volume which is the source of a snapshot is referred to as the original data and the image of the logical volume created at Time 0 is referred to as the snapshot.

Figure 3:
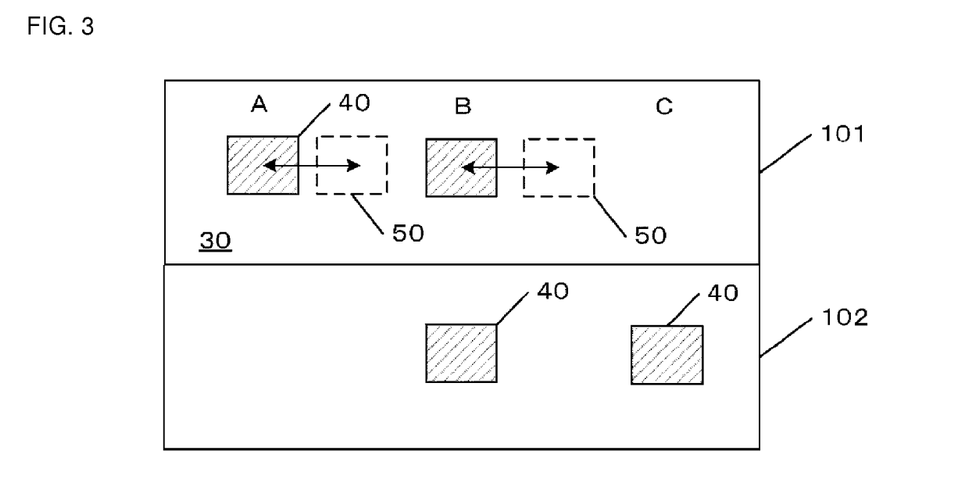
FIG. 3 is an image diagram showing a snapshot that was created in the situation shown in FIG. 2.

FIG. 3 shows an image when a snapshot has been created at Time 0 using a function provided by GPFS with regard to the storage states A, B and C shown in FIG. 2. In FIG. 3, block 50 delineated by dotted lines is a snapshot of data 40. Because data 40 is present in the disk cache 101 in storage states A and B, it can create a snapshot 50 properly at Time 0.

Because data is not present in the disk cache 101 in storage state C, a snapshot cannot be created using GPFS even when there is valid (the latest) data 40 present on the physical tape 102. Therefore, in order to create a snapshot of data in storage state C at Time 0, an operation has to be performed in advance to recall data on the physical tape 102 and write the data to the disk cache 101.

However, in the TS7700, a maximum of 2 million logical volumes can be defined. When there is a large amount of migrated logical volumes, it can take a long time to recall all of the logical volumes. Therefore, Time 0 itself cannot be defined. Also, all volumes cannot be recalled at once because of the limited disk cache capacity. Therefore, it is inappropriate and practically impossible to recall data on the physical tape in advance. This particular problem is to be solved by the method of the present invention explained in detail below.

Figure 4:
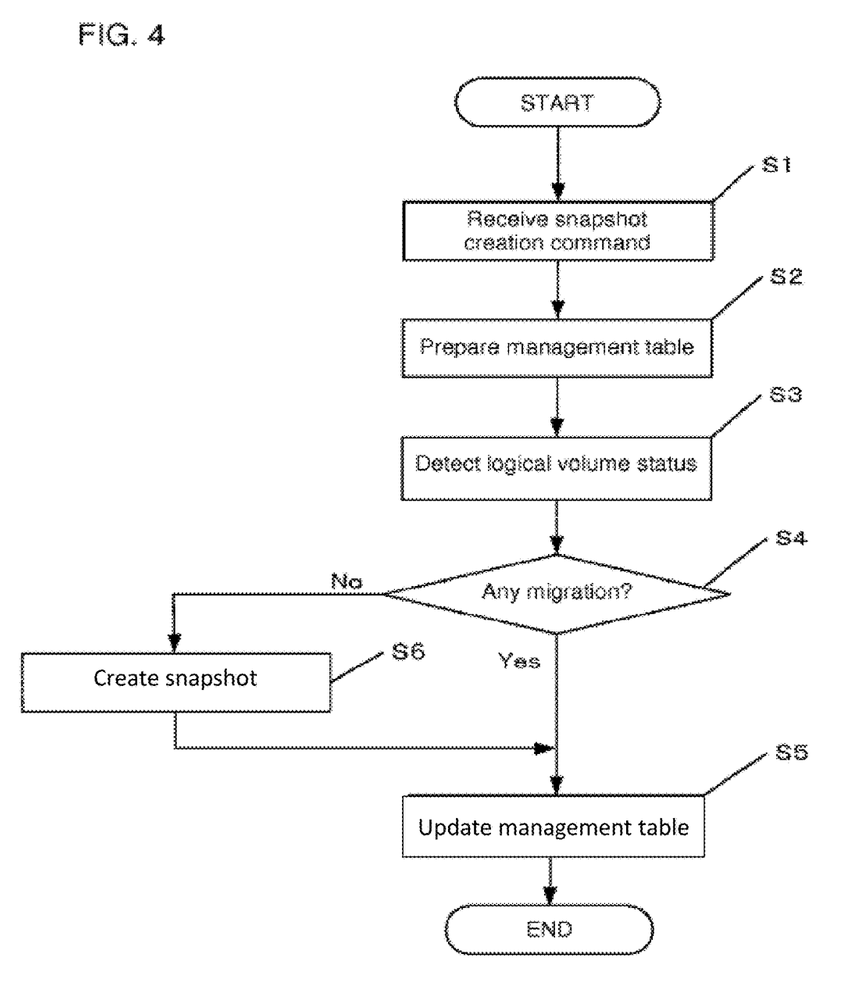
FIG. 4 is a flowchart of the method of the present invention.

The following is an explanation with reference to FIG. 4 of the operational flow of the method of the present invention which is used to create and manage a snapshot of hierarchically managed logical volumes. The operational flow in FIG. 4 is embodied in the configuration shown in FIG. 1 by software executed by a computer (controller) in the storage system 10.

In Step S1, a command is received from the host to create a snapshot of the logical volumes. More specifically, the user issues a command to the storage system via the host or a management interface. In Step S2, a management table is prepared for managing the snapshot. More specifically, a DB2® table is prepared (duplicated) for the snapshot. Here, a DB2 table refers to a DB2 table defined by the TS7700 as a relational database. The DB2 table includes various types of metadata used to manage the snapshot as explained below.

Figure 5:
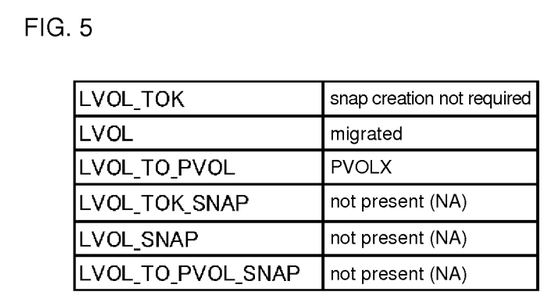
FIG. 5 is a diagram showing an example of a management table prepared in Step S2 of FIG. 4.

FIG. 5 is an example of a management table (DB2 table) prepared in Step S2. In the management table, LVOL_TOK, LVOL and LVOL_TO_PVOL in line 1 through line 3 include metadata information described below that is related to the original data (logical volumes), and LVOL_TOK_SNAP, LVOL_SNAP and LVOL_TO_PVOL_SNAP in line 4 through line 6 include metadata information described below that is related to the snapshot.

(a) LVOL_TOK: This holds the status of each logical volume (whether or not the most recent data is present, etc.). An entry is created when the user defines a logical volume irrespective of whether the data is located on the disk or the physical tape.

(b) LVOL: This holds information indicating in which physical volume the logical volume is located (whether or not the data is migrated or pre-migrated). As in the case of LVOL_TOK, an entry is created when the user defines a logical volume irrespective of whether the data is located on the disk or the physical tape.

(c) LVOL_TO_PVOL: When each logical volume is migrated or pre-migrated, this holds information indicating whether or not the logical volume is located on physical tape. An entry is created when a logical volume has pre-migrated to physical tape.

In the example shown in FIG. 5, the management table is for logical volumes (original data) which have already migrated and are present only on physical tape. As a result, "migrated" is indicated for LVOL in line 2, and physical volume PVOLX is indicated as the storage location of the migrated logical volume (original data) for LVOL_TO_PVOL in line 3. LVOL_TOK in line 1 indicates that a snapshot (snap) does not have to be created of the initial state. LVOL_TOK_SNAP, LVOL_SNAP and LVOL_TO_PVOL_SNAP in line 4 through line 6 are not applicable (NA) in the initial state.

Returning to FIG. 4, the storage state of the logical volumes (original data) is detected in Step S3. More specifically, it is detected whether or not the logical volumes are in state A, B or C shown in FIG. 2. In Step S4, it is determined whether or not the logical volumes (original data) have migrated. If the determination is YES, there is no data present on the disk cache. Therefore, an actual snapshot is not created and an image cannot be obtained at Time 0 even when a command has been issued to the GPFS to create a snapshot. Thus, the management table is updated in Step S5 without performing the processing required to create a snapshot right away.

Figure 6:
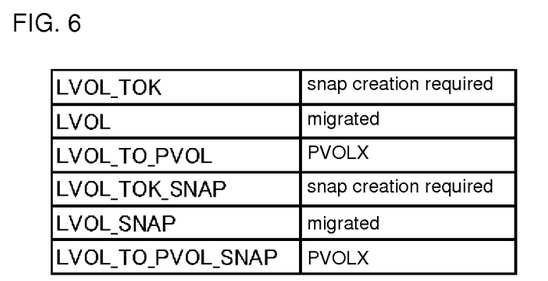
FIG. 6 is a diagram showing the management table after an update.

FIG. 6 shows the management table after the update. First, "snap creation required" is recorded in LVOL_TOK and in LVOL_TOK_SNAP, which is the field indicating the current snapshot status. This indicates that another snapshot has to be created for each logical volume unit at a stage when the original data has been recalled. Then, "migrated" is recorded in both LVOL_SNAP and LVOL which indicates that the logical volumes have migrated. The physical volume PVOLX of the migrated original data is recorded in LVOL_TO_PVOL_SNAP.

Figure 7:
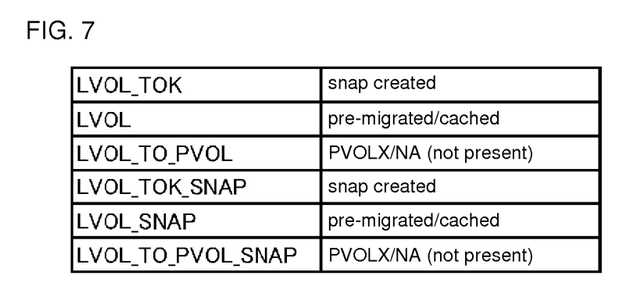
FIG. 7 is a diagram showing the management table after an update.

When the determination in Step S4 is NO, original data is present in the disk cache. In Step S6, a snapshot is created of the original data at Time 0, as shown in the examples of states A and B in FIG. 3. The process then goes to S5, and the management table is updated. FIG. 7 shows the updated management table after a snapshot has been created. In the management table shown in FIG. 7, "cached" refers to storage state A in FIG. 2 in which original data is present in the disk cache 101, and "pre-migrated" refers to storage state B in FIG. 2 in which original data is present in both the disk cache 101 and physical tape 102.

Time 0 snapshots of all the logical volumes managed by TS7700 have been completed at this point. However, an actual snapshot image is not created at Time 0 of the logical volumes which have migrated. In the present invention, when any of the following events occurs after the Time 0 snapshot, a separate snapshot is created and managed for the migrated logical volumes. In one embodiment, the "mmcrsnapshot" command in GPFS can be used to create a snapshot at once of all of the data in the managed file system. A snapshot of separate files can be created using the "mmclone" command.

(A) If Original Data or Snapshot Has Been Accessed (Logical Volumes are Read and Written)
(A1) Because the host can only access files located in the disk cache, the TS7700 recalls migrated original data when the data has been accessed. When a snapshot is accessed, it is recalled from the physical tape written to LVOL_TO_PVOL_SNAP.
(A2) Original data can be accessed from the host once it has been recalled and its snapshot is created in an instant.
(A3) Afterwards, the management table is updated.

Figure 8:
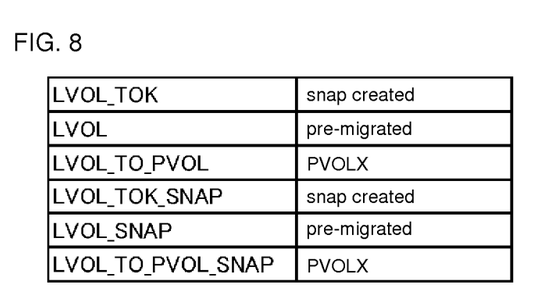
FIG. 8 is a diagram showing the management table after an update.

FIG. 8 shows the management table after it has been updated.

LVOL_TOK and LVOL_TOK_SNAP have been changed from "snap creation required" to "snap created", and LVOL and LVOL_SNAP have been changed to "pre-migrated".

Figure 9:
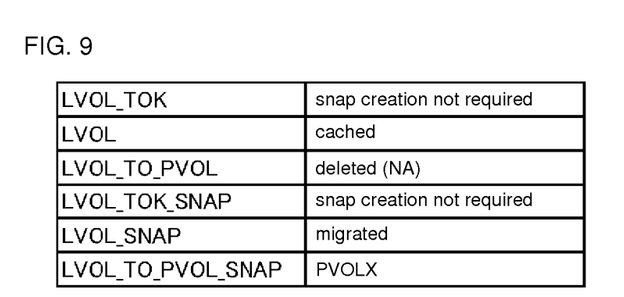
FIG. 9 is a diagram showing the management table after an update.

(B) If Original Files Have Been Overwritten
When "Write From BOT (Beginning of Tape)" has occurred, the management table is updated in the following way. LVOL_TOK has to be changed to "snap creation not required", LVOL has to be updated to "cached" to indicate that data is present on the disk, and LVOL_TO_PVOL has to be deleted (NA). However, because an entry for the snapshot remains in LVOL_TO_PVOL_SNAP, the logical volumes of the original file present on the physical tape are not invalidated. In this case, there is no longer any need to create a snapshot, and future access is provided to the original file and snapshot as two separate files. FIG. 9 shows the management table after it has been updated.

Figure 10:
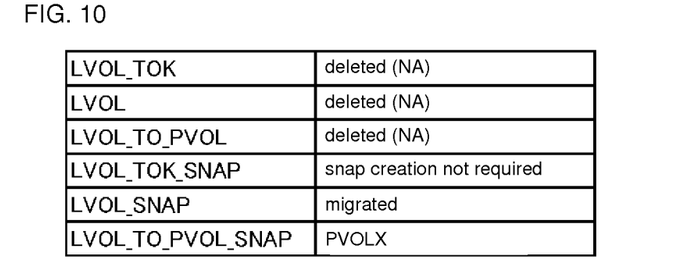
FIG. 10 is a diagram showing the management table after an update.

(C) If Original Files Have Been Deleted
In this case, LVOL_TOK, LVOL and LVOL_TO_PVOL are deleted and the management table is updated accordingly. The status of LVOL_TOK_SNAP, LVOL_SNAP and LVOL_TO_PVOL_SNAP are the same as case (B) above. FIG. 10 shows the management table after it has been updated.

A snapshot does not have to be created if any of the following has occurred before a snapshot has been created using GPFS.

Figure 11:
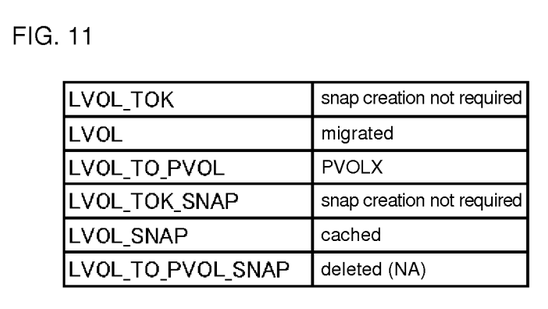
FIG. 11 is a diagram showing the management table after an update.

(D) If Snapshot Overwrite (Write from BOT) Has Occurred
In this case, the management table is updated in the following way without any recall because a snapshot does not have to be created of the original files. LVOL_TOK and LVOL_TOK_SNAP are changed from "snap creation required" to "snap creation not required", LVOL_SNAP is updated to "cached" indicating that data is present on the disk, and LVOL_TO_PVOL_SNAP is deleted (NA). FIG. 11 shows the management table after it has been updated.

(E) If Snapshot Deletion Has Occurred

Figure 12:
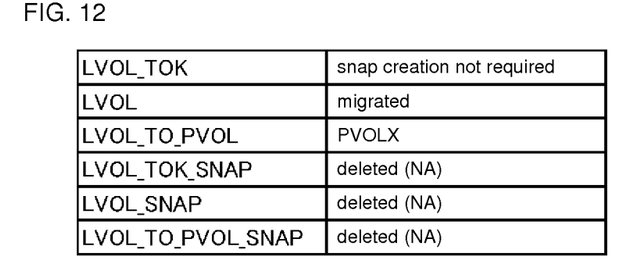
FIG. 12 is a diagram showing the management table after an update.

In this case, the management table is updated in the following way. LVOL_TOK_SNAP, LVOL_SNAP and LVOL_TO_PVOL_SNAP are deleted (NA), and LVOL_TOK is changed from "snap creation required" to "snap creation not required". FIG. 12 shows the management table after it has been updated.

As mentioned above, three values can be applied to the fields indicating the "status of a current snapshot" added to LVOL_TOK and LVOL_TOK_SNAP: "snap creation not required", "snap creation required", and "snap created". The logical volume and snapshot of "snap creation not required" are treated as separate logical volumes.

Embodiments of the present invention have been explained with reference to the drawings, but the present invention is not limited to these embodiments. In the embodiments described above, hierarchical management was explained between a disk and physical tape. However, the present invention is not limited to this and can be applied to any system that is hierarchically managed using different levels. A similar mechanism can be realized by applying an existing snapshot function to an upper-level disk device and recording the state of data (metadata) which has been moved to a lower-level disk drive as metadata. Snapshot management can be performed using the same technique even when three or more levels are used.

REFERENCE SIGNS LIST

1: Overall system
10: Storage system
20: Host, multiple hosts (servers)
30: Logical volume
40: Data
50: Snapshot
101: 1st storage medium (HDD, etc.)
102: 2nd storage medium (tape drive, etc.)

The invention claimed is:

1. A non-transitory computer readable article of manufacture comprising a storage medium having program instructions embodied therewith, said program instructions tangibly embodying computer readable instructions, the program instructions being readable and executable by a computer to cause the computer to perform a method for creating and managing snapshots of hierarchically managed logical volumes in a storage system, management of the snapshots being independent of migration status of the logical volumes, the storage system including first level storage and second level storage, the second level storage being lower than the first level storage, the method comprising:

receiving a command for creating a snapshot of a logical volume;

creating a management table for managing the snapshot of the logical volume, the management table including first metadata indicating creation status of the snapshot, second metadata indicating management status of data to be included in the snapshot, and third metadata indicating storage location of the logical volume, the storage location being either the first level storage or the second level storage, the first metadata, second metadata, and third metadata being separate and distinct data elements;

detecting migration status of the logical volume;

responsive to the logical volume being in the first level storage, creating a snapshot from the logical volume while the logical volume is in the first level storage, and updating the management table, the updating changing the first metadata to indicate that the snapshot of the logical volume has been created, changing the second metadata to indicate that the data in the logical volume is stored in the first level storage or is stored in both the first level storage and the second level storage, and changing the third metadata to indicate that the first level storage is the storage location of the logical volume; and responsive to the logical volume being migrated from the first level storage to the second level storage, updating the management table without recalling the logical volume from the second level storage to the first level storage, the updating changing the first metadata to indicate that creation of a snapshot is required, changing the second metadata to indicate that the data in the logical volume has migrated from the first level storage to the second level storage, and changing the third metadata to indicate that the second level storage is the storage location of the logical volume.

2. The article of manufacture of claim 1 embodying instructions which, when executed, cause the computer to carry out the method further comprising:

responsive to receiving a request for access to the logical volume or the snapshot, recalling the logical volume from the second level storage to the first level storage;

creating a snapshot from the logical volume while the logical volume is in the first level storage; and updating the management table, the updating changing the first metadata to indicate that the snapshot of the logical volume has been created, changing the second metadata to indicate that the data in the logical volume has pre-migrated, and changing the third metadata to indicate that the second level storage is the storage location of the logical volume.

3. The article of manufacture of claim 1 embodying instructions which, when executed, cause the computer to carry out the method further comprising:

responsive to receiving a request to overwrite the logical volume or to delete the logical volume, updating the management table, the updating changing the first metadata to indicate that creation of a snapshot is not required, changing the second metadata to indicate that the data in the logical volume has been cached, and changing the third metadata to indicate that the second level storage is the storage location of the logical volume.

4. The article of manufacture of claim 1 embodying instructions which, when executed, cause the computer to carry out the method further comprising:

responsive to receiving a request to overwrite the snapshot, updating the management table without recalling the logical volume from the second level storage to the first level storage, the updating changing the first metadata to indicate that creation of a snapshot is not required, changing the second metadata to indicate that the data in the logical volume has migrated from the first level storage to the second level storage, and changing the third metadata to indicate that deletion has been performed.

5. The article of manufacture of claim 1 embodying instructions which, when executed, cause the computer to carry out the method further comprising:

responsive to receiving a request to delete the snapshot, updating the management table without recalling the logical volume from the second level storage to the first level storage, the updating changing the first metadata to indicate that deletion has been performed, changing the second metadata to indicate that deletion has been performed, and changing the third metadata to indicate that deletion has been performed.

6. The article of manufacture of claim 1 embodying instructions which, when executed, cause the computer to carry out the method further comprising:

responsive to the logical volume being stored in the first level storage or stored in both the first level storage and the second level storage, creating a snapshot of the logical volume in the first level storage; and updating the management table, the updating changing the first metadata to indicate that the snapshot has been created, changing the second metadata to indicate that the data in the logical volume is stored in the first level storage or is stored in both the first level storage and the second level storage, and changing the third metadata to indicate that the second level storage is not the storage location of the logical volume or the second level storage is the storage location of the logical volume.

7. The article of manufacture of claim 1, wherein the first level storage includes a hard disk drive (HDD), and the second level storage includes a tape drive.

8. The article of manufacture of claim 1 further embodying transferring instructions which, when executed, cause the computer to carry out the method further comprising:

transferring over a network from a remote data processing system, the computer readable instructions; and storing, responsive to the transferring, the computer readable instructions in a data processing system.

9. The article of manufacture of claim 3 further embodying downloading instructions which, when executed, cause the computer to carry out the method further comprising:

downloading, from a server data processing system where the computer readable instructions are stored, over a network to a remote data processing system, the computer readable instructions for use in a computer readable storage device associated with the remote data processing system.

10. A system for creating and managing snapshots of hierarchically managed logical volumes in a storage system, management of the snapshots being independent of migration status of the logical volumes, the storage system including first level storage and second level storage, the second level storage being lower than the first level storage, the system comprising:

at least one host computer connected to the storage system, wherein the storage system is configured to perform steps comprising:

receiving, from the at least one host computer, a command for creating a snapshot of a logical volume;

creating a management table for managing the snapshot, the management table including first metadata indicating creation status of the snapshot, second metadata indicating management status of data included in the snapshot, and third metadata indicating storage location of the logical volume, the first metadata, second metadata, and third metadata being separate and distinct data elements, the storage location being either the first level storage of the second level storage;

detecting migration status of the logical volume;

responsive to the logical volume being in the first level storage, creating a snapshot from the logical volume while the logical volume is in the first level storage, and updating the management table, the updating changing the first metadata to indicate that the snapshot of the logical volume has been created, changing the second metadata to indicate that the data in the logical volume is stored in the first level storage or is stored in both the first level storage and the second level storage, and changing the third metadata to indicate that the first level storage is the storage location of the logical volume; and responsive to the logical volume being migrated from the first level storage to the second level storage, updating the management table without recalling the logical volume from the second level storage to the first level storage, the updating changing the first metadata to indicate that creation of a snapshot is required, changing the second metadata to indicate that the data is on a logical volume that has migrated from the first level storage to the second level storage, and changing the third metadata to indicate that the second level storage is the storage location of the logical volume.

11. The system of claim 10, wherein the storage system is further configured to perform steps comprising:

responsive to receiving a request for access to the logical volume or the snapshot, recalling the logical volume from the second level storage to the first level storage;

creating a snapshot from the logical volume while the logical volume is in the first level storage; and updating the management table, the updating changing the first metadata to indicate that the snapshot has been created, changing the second metadata to indicate that the data is on a logical volume that has pre-migrated, and changing the third metadata to indicate that the second level storage is the storage location of the logical volume.

12. The system of claim 10, wherein the storage system is further configured to perform steps comprising:

responsive to receiving a request to overwrite the logical volume or to delete the logical volume, updating the management table, the updating changing the first metadata to indicate that creation of a snapshot is not required, changing the second metadata to indicate that the data is on a logical volume that has migrated from the first level storage to the second level storage, and changing the third metadata to indicate that the second level storage is the storage location of the logical volume.

13. The system of claim 10, wherein the storage system is further configured to perform steps comprising:

responsive to receiving a request to overwrite the snapshot, updating the management table, the updating changing the first metadata to indicate that creation of a snapshot is not required, changing the second metadata to indicate that the data is on a logical volume that has been cached, and changing the third metadata to indicate that deletion has been performed.

14. A method for creating and managing snapshots of hierarchically managed logical volumes in a storage system, management of the snapshots being independent of migration status of the logical volumes, the storage system including first level storage and second level storage, the second level storage being lower than the first level storage, the method comprising:

receiving a command for creating a snapshot of a logical volume;

preparing, using a processor and a memory, a management table for managing the snapshot, the management table including first metadata indicating creation status of the snapshot, second metadata indicating management status of the snapshot, and third metadata indicating storage location of the logical volume, the first metadata, second metadata, and third metadata being separate and distinct data elements;

detecting migration status of the logical volume;

responsive to the logical volume being in the first level storage, creating a snapshot from the logical volume while the logical volume is in the first level storage, and updating the management table, the updating changing the first metadata to indicate that the snapshot of the logical volume has been created, changing the second metadata to indicate that the data in the logical volume is stored in the first level storage or is stored in both the first level storage and the second level storage, and changing the third metadata to indicate that the first level storage is the storage location of the logical volume; and responsive to the logical volume being migrated from the first level storage to the second level storage, the processor updating the management table without recalling the logical volume from the second level storage to the first level storage, the updating of the management table changing the first metadata to indicate that creation of a snapshot is required, changing the second metadata to indicate that snapshot data on the logical volume has migrated from the first level storage to the second level storage, and changing the third metadata to indicate that the second level storage is the storage location of the logical volume.

15. The method according to claim 14, further comprising:

responsive to receiving a request for access to the logical volume or the snapshot, the processor recalling the logical volume from the second level storage to the first level storage;

the processor creating a snapshot of the data from the logical volume while the logical volume is in the first level storage; and the processor updating the management table, the updating of the management table changing the first metadata to indicate that the snapshot has been created, changing the second metadata to indicate that the logical volume containing the data has pre-migrated, and the third metadata to indicate that the second level storage is the storage location of the logical volume.

16. The method according to claim 14, further comprising:

responsive to receiving a request to overwrite the logical volume or to delete the logical volume, updating the management table, the updating of the management table changing the first metadata to indicate that creation of a snapshot is no longer required, changing the second metadata to indicate that snapshot data on the logical volume has migrated from the first level storage to the second level storage, and changing the third metadata to indicate that the second level storage is the storage location of the logical volume.

17. The method according to claim 14, further comprising:

responsive to receiving a request to overwrite the snapshot, the processor updating the management table, the updating of the management table changing the first metadata to indicate that creation of a snapshot is no longer required, changing the second metadata to indicate that the snapshot data is on a logical volume located in the first level storage, and changing the third metadata to indicate that deletion has been performed.

18. The method according to claim 14, further comprising:

responsive to receiving a request to delete the snapshot, the processor updating the management table, the updating of the management table changing the first metadata to indicate that deletion has been performed, changing the second metadata to indicate that deletion has been performed, and changing the third metadata to indicate that deletion has been performed.

19. The method according to claim 14, further comprising:

responsive to the logical volume being stored in the first level storage or stored in both the first level storage and the second level storage, the processor creating a snapshot of the logical volume in the first level storage; and the processor updating the management table, the updating of the management table changing the first metadata to indicate that the snapshot has been created, changing the second metadata to indicate that the snapshot data on the logical volume is stored in the first level storage or is stored in both the first level storage and the second level storage, and changing the third metadata to indicate that the second level storage is not the storage location of the logical volume or the second level storage is the storage location of the logical volume.

20. The method according to claim 14, wherein the first level storage includes a hard disk drive (HDD), and the second level storage includes a tape drive.

* * * * *